US010532301B2

(12) United States Patent
Holliday et al.

(10) Patent No.: US 10,532,301 B2
(45) Date of Patent: Jan. 14, 2020

(54) HORIZONTAL PRESSURE FILTER WITH WASHING LIQUID RECOVERY, AND A FILTER SYSTEM, A METHOD FOR OPERATING AND A COMPUTER PROGRAM PRODUCT RELATED THERETO

(71) Applicant: OUTOTEC (FINLAND) OY, Espoo (FI)

(72) Inventors: Lloyd Holliday, Nottinghamshire (GB); Teppo Suutari, Heituinlahti (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/239,846

(22) Filed: Jan. 4, 2019

(65) Prior Publication Data
US 2019/0151783 A1 May 23, 2019

Related U.S. Application Data

(63) Continuation of application No. PCT/FI2016/050513, filed on Jul. 11, 2016.

(51) Int. Cl.
*B01D 35/16* (2006.01)
*B01D 25/30* (2006.01)
(Continued)

(52) U.S. Cl.
CPC ........... *B01D 35/16* (2013.01); *B01D 25/164* (2013.01); *B01D 25/281* (2013.01);
(Continued)

(58) Field of Classification Search
CPC .... B01D 35/16; B01D 25/284; B01D 25/164; B01D 25/281; B01D 25/003; B01D 25/30–302
See application file for complete search history.

(56) References Cited

U.S. PATENT DOCUMENTS

| 5,112,502 A | 5/1992 | Satoh et al. |
| 2015/0114914 A1* | 4/2015 | Bohnke ............... B01D 25/164 210/771 |

FOREIGN PATENT DOCUMENTS

| EP | 2002873 A1 | 12/2008 |
| WO | 2005056157 A1 | 6/2005 |
| WO | 2015018975 A1 | 2/2015 |

OTHER PUBLICATIONS

International Search Report issued by the European Patent Office acting as the International Searching Authority in relation to International Application No. PCT/FI2016/050513 dated May 4, 2017 (3 pages).

(Continued)

*Primary Examiner* — Liam Royce
(74) *Attorney, Agent, or Firm* — Robert P. Michal, Esq.; Carter, DeLuca & Farrell LLP (57) ABSTRACT

A horizontal pressure filter including a washing liquid recovery channel for receiving unused washing liquid from the washing liquid inlet channel and conducting said unused washing liquid to a washing liquid recovery outlet. A flow controller arranged to selectively open and close a flow connection between the washing liquid inlet channel and the washing liquid recovery channel, and respectively, between a compressed gas inlet and the washing liquid inlet channel, such that a gas flow from the compressed gas inlet to the washing liquid recovery channel via the washing liquid inlet channel may be induced, so as to flush unused washing liquid remaining in the washing liquid inlet channel to the washing liquid recovery outlet.

17 Claims, 4 Drawing Sheets

(51) Int. Cl.
    *B01D 25/28*         (2006.01)
    *B01D 25/164*      (2006.01)
    *B01D 25/00*         (2006.01)

(52) U.S. Cl.
    CPC ......... *B01D 25/284* (2013.01); *B01D 25/302* (2013.01); *B01D 25/003* (2013.01); *B01D 25/30* (2013.01)

(56) References Cited

OTHER PUBLICATIONS

Written Opinion of the International Searching Authority issued by the European Patent Office acting as the International Searching Authority in relation to International Application No. PCT/FI2016/050513 dated May 4, 2017 (5 pages).

* cited by examiner

Fig. 4

HORIZONTAL PRESSURE FILTER WITH WASHING LIQUID RECOVERY, AND A FILTER SYSTEM, A METHOD FOR OPERATING AND A COMPUTER PROGRAM PRODUCT RELATED THERETO

CROSS-REFERENCE TO RELATED APPLICATIONS

This application is a continuation PCT International Application No. PCT/FI2016/050513 filed Jul. 11, 2016, the disclosure of this application is expressly incorporated herein by reference in its entirety.

FIELD OF THE DISCLOSURE

The present disclosure relates to horizontal pressure filters and more particularly to horizontal pressure filters in which washing liquids are used for washing the filter cake The present disclosure further concerns a system having such a horizontal pressure filter, a method of operating such a horizontal pressure filter, and a computer program product related thereto.

BACKGROUND OF THE DISCLOSURE

When operating a horizontal pressure filter, the filter cakes formed within the filter chambers are often washed using a washing liquid. As the washing liquid is typically fed to the filter chamber via a partially common flow route with the filtrate outlet, any unused washing liquid remaining in the flow route is flushed away by the filtrate during the filtration cycle and hence, can not be used.

However, washing liquid may be a valuable process medium, particularly when condensate is used, because a lot of energy has been consumed to produce the condensate. Moreover, washing liquid may be regarded as valuable resource when the horizontal pressure filter is operated at a remote location, where all resources are scarce, or when an exotic washing liquid is used, for example.

BRIEF DESCRIPTION OF THE DISCLOSURE

An object of the present disclosure is to enable the recovery of unused washing liquid remaining in the washing liquid inlet channel so that it can be used during following operation cycles.

The objects of the disclosure are achieved by the horizontal pressure filter, a system having such horizontal pressure filter, a method of operating a horizontal pressure filter, and a computer program product which are characterized by what is stated in the independent claims. The preferred embodiments of the disclosure are disclosed in the dependent claims.

The disclosure is based on the idea of providing a gas flow via the washing liquid inlet to a washing liquid recovery channel so that washing liquid remaining in the washing liquid inlet channel is flushed by the gas flow to the washing liquid recovery channel.

An advantage of the aspects according to the disclosure is that less washing liquid is used, and hence, a more economical and ecological filtration process is achieved.

BRIEF DESCRIPTION OF THE DRAWINGS

In the following the disclosure will be described in greater detail by means of preferred embodiments with reference to the accompanying drawings, in which

FIGS. 3A, 36 and 3C illustrate horizontal pressure filter arrangements in which a washing liquid inlet channel, a washing liquid recovery channel and a filtrate outlet channel are provided at a same end of the pressure filter, while a compressed gas inlet is provided at an opposite end in connection with a first washing liquid inlet duct.

It should be noted, that the enclosed drawings schematically illustrate arrangements according to then disclosure in a simplified manner for the purpose of clarity, and that the drawings should not thus be interpreted restrictively.

DETAILED DESCRIPTION OF THE DISCLOSURE

According to a first aspect of the disclosure, a horizontal pressure filter 1 having multiple filter plates forming at least a filter chamber therebetween is provided. In this context the term 'horizontal pressure filter' is used to described a pressure filter having multiple filter plates, between which filter chambers are formed. Particularly, the filter plates are, when in use, movable away and towards each other in a horizontal direction for opening and closing said filter chambers.

A slurry feed channel 2 is provided for feeding slurry into a filter chamber so as to be filtered therein.

A filtrate outlet channel 4 is provided for receiving filtrate from the filter chamber and conducting said filtrate to a filtrate outlet 4 of the horizontal pressure filter.

A washing liquid inlet channel 3 is provided for feeding washing liquid from a washing liquid inlet into a filter chamber so as to wash a filter cake formed in said filter camber.

A washing liquid discharge channel 8 is provided for receiving used washing liquid from the filter chamber and conducting said used washing liquid to a washing liquid discharge outlet of the horizontal pressure filter.

A washing liquid recovery channel 5 is provided for receiving unused washing liquid from the washing liquid inlet channel 3 and conducting said unused washing liquid to washing liquid recovery outlet.

A compressed gas inlet 6 is provided for providing a gas flow. Preferably, but not necessarily, a compressed air inlet is provided as the compressed gas inlet for providing an airflow. However, other types of gasses may be used for providing a gas flow. If the horizontal pressure filter 1 is equipped with means for drying the filter cake using a gas flow, the same gas is advantageously used both for drying the filter cake and flushing the unused washing liquid remaining in the washing liquid inlet channel. Particularly, if the washing liquid used is, for example, flammable or easily oxidized, gasses such as nitrogen or carbon dioxide may be used for producing a gas flow. Moreover, the compressed gas inlet 6 is arranged to provide sufficiently high gas pressure for achieving a suitable gas flow to flush the unused washing liquid remaining in the washing liquid inlet duct 3, yet respectively, a sufficiently low gas pressure that a gas flow is not induced via the filter cake.

Furthermore, flow control means 7a-7e are provided for controlling the flow of the slurry, filtrate, unused washing liquid, used washing liquid, recovered washing liquid and gas. Suitably, the flow control means comprises one or more valves operationally connected to a control device, such as a programmable logic controller or a control system for controlling the horizontal filter press 1.

The filtrate outlet channel 4, washing liquid inlet channel 3 and the washing liquid recovery channel 5 may advantageously be arranged to at least partially share a common physical entity as their respective flow route.

Alternatively, the filtrate outlet channel 4 and the washing liquid inlet channel 3 may advantageously be arranged to at least partially share a common physical entity as their respective flow route, while the washing liquid recovery channel 5 may suitably be provided as a its own separate physical entity.

Preferably, but not necessarily, the washing liquid discharge channel 8 is provided as its own separate physical entity regardless of the other channels.

The flow control means 7a-7e are arranged to selectively open or close a flow connection between the washing liquid inlet channel 3 and the washing liquid recovery channel 5, and respectively, between the compressed gas inlet 6 and the washing liquid inlet channel 3.

This allows a gas flow to be induced from the compressed gas inlet 6 to the washing liquid recovery channel 5 via the washing liquid inlet channel 3, so as to flush unused washing liquid remaining in the washing liquid inlet channel 3 to the washing liquid recovery outlet.

It has been discovered that recovering unused washing liquid remaining in the washing liquid inlet channel 3 achieves a more uniform washing liquid distribution within the filter cakes during following cycles as the flow of the washing liquid introduced into the filter chambers is more uniform right from the beginning due to the washing liquid inlet channel being empty at the beginning of the cake washing operation.

Moreover, horizontal filter presses 1 equipped with means for drying the filter cakes with a gas flow may use the washing liquid inlet channel for introducing the airflow to the filter chamber. In such a case the drying is more efficient and uniform as any remaining washing liquid is not introduced to the filter cake.

According to an embodiment of the first aspect, the washing liquid inlet channel comprises at least a first washing liquid inlet duct 3a and a second washing liquid inlet duct 3b for feeding washing liquid into the filter chamber from at least two separate points, respectively. This enables the washing liquid to be more uniformly introduced to the filter cake, and thus a more uniform cake is achieved.

Moreover, a flow route is provided between the first and second washing liquid inlet ducts 3a, 3b.

In such an arrangement, the flow control means 7a-7e are arranged to selectively open or close a flow connection between either the first 3a, the second 3b or both washing liquid inlet ducts 3a, 3b and the washing liquid recovery channel 5, and respectively, between the compressed gas inlet 6 and the first 3a, the second 3b or both washing liquid inlet ducts 3a, 3b.

This enables a gas flow to be induced from the compressed gas inlet 6 to the washing liquid recovery channel 5 via the first 3a, second 3b or both washing liquid inlet ducts 3a, 3b, so as to flush unused washing liquid remaining in the washing liquid inlet channel 3 to the washing liquid recovery outlet.

The flow route between the first and second washing liquid inlet ducts 3a, 3b may be provided at least via the filter chamber.

Additionally, or alternatively, the flow route between the first and second washing liquid inlet ducts 3a, 3b may be provided at least via one or more dedicated passages 3c formed within one or more of the filter plates.

Additionally, or alternatively, the flow route between the first and second washing liquid inlet ducts 3a, 3b may be provided at least via one or more dedicated bypass duct 3d running between the first and second washing liquid inlet ducts 3a, 3b. Suitably, such a bypass duct 3d runs directly between the first and second washing liquid inlet duct. Moreover, such a bypass duct 3d is suitably a separate physical entity dedicated for this function. For example, such a bypass duct 3d may be provided at either end of the horizontal filter press, outside of the filter plates. Moreover, the bypass duct 3d should be dimensioned with a sufficiently large flow cross section, that a substantial proportion of the gas flow may run via the bypass duct 3d even if other flow routes between the first and second washing liquid inlet ducts 3a, 6b are provided. This ensures that the gas flow runs through the length of both washing liquid inlet ducts 3a, 3b, and consequently, the unused washing liquid remaining therein is flushed to the washing liquid recovery channel 5. In connection with such a bypass duct 3d, the flow control means 7a-7e are preferably arranged to selectively open or close the flow connection between the first and second washing fluid inlet ducts 3a, 3b via the dedicated bypass duct 3d.

Preferably, but not necessarily, the dedicated bypass duct 3d is arranged at an opposite end of the horizontal pressure filter 1 with respect to the compressed gas inlet 6 and washing liquid recovery channel 5, which results in that a gas flow induced therebetween via the dedicate bypass duct 3d will run through the whole length of both of the washing liquid inlet ducts 3a, 3b. This in turn, ensures a complete and efficient recovery of the unused washing liquid remaining in the washing liquid inlet channel 3.

According to another embodiment of the first aspect, the flow control means 7a, 7d, 7e are arranged to selectively open or close a flow connection between the first washing liquid inlet duct 3a and the washing liquid recovery channel 5, and respectively, between the compressed gas inlet 6 and the second washing liquid inlet duct 3b. This results in a gas flow being induced from the compressed gas inlet 6 to the washing liquid recovery channel 5 via the second washing liquid inlet duct 3b, the flow route between the first and second washing liquid inlet ducts 3a, 3b, and the first washing liquid inlet duct 3a.

According to another embodiment of the first aspect, the flow control means 7a, 7d, 7d' are arranged to selectively open or close a flow connection between the first washing liquid inlet duct 3a and the washing liquid recovery channel 5, and respectively, between the compressed gas inlet 6 and the first 3a or second 3b washing liquid inlet duct.

This enables a gas flow to be induce from the compressed gas inlet 6 to the washing liquid recovery channel 5, at different time instances, via two different routes. Namely, via the second washing liquid inlet duct 3b, the flow route between the first and second washing liquid inlet ducts 3a, 3b, and the first washing liquid inlet duct 3a, or the first washing liquid inlet duct 3a.

According to another embodiment of the first aspect the flow control means 7a, 7d, 7e, 7f are arranged to selectively open or close a flow connection between the first washing liquid inlet duct 3a and the washing liquid recovery channel 5, and respectively, between the compressed gas inlet 6 and the second 3b washing liquid inlet duct 3, such that a gas flow from the compressed gas inlet 6 to the washing liquid recovery channel 5 can be induced, at different time instances, via different routes.

Firstly, the gas flow from the compressed gas inlet 6 to the washing liquid recovery channel 5 can be induced via the second washing liquid inlet duct 3b, the flow route between the first and second washing liquid inlet ducts 3a, 3b, provided as either via the filter chamber or one or more dedicated passages 3c formed within one or more filter plates, and the first washing liquid inlet duct 3a.

Secondly, the gas flow from the compressed gas inlet 6 to the washing liquid recovery channel 5 can be induced via the second washing liquid inlet duct 3b, the flow route between the first and second washing liquid inlet duct provided as one or more dedicated bypass ducts 3d running between the first and second washing liquid inlet ducts 3a, 3b, and the first washing liquid inlet duct 3a. It should be noted, that not all of the gas flow needs to flow via the dedicated bypass duct 3d, but a portion of it may still flow via the flow route between the first and second washing inlet ducts 3a, 3b, provided as either via the filter chamber or one or more dedicated passages 3c formed within one or more filter plates. As discussed above, the dedicated bypass duct 3d should, however, be dimensioned such that a substantial proportion of the gas flow runs through the length of both washing liquid inlet ducts 3a, 3b, and consequently, the unused washing liquid remaining therein is flushed to the washing liquid recovery channel 5.

According to a further embodiment of the first aspect, the flow control means 7a, 7d are arranged to selectively open or close a flow connection between the first washing liquid inlet duct 3a and the washing liquid recovery channel 5, and respectively, between the compressed gas inlet 6 and the first washing liquid inlet duct 3a.

As a result, a gas flow from the compressed gas inlet 6 to the washing liquid recovery channel 5 may be induced via the first washing liquid inlet duct 3a, so as to flush unused washing liquid remaining in the washing liquid inlet channel 3 to the washing liquid recovery outlet.

Preferably, but not necessarily, at least a first 3a and second 3b washing liquid inlet ducts are provided such that the first washing liquid inlet duct 3a is, when in use, below the second washing liquid duct 3b. Consequently, most of the unused washing liquid remaining in the washing liquid inlet channel 3 will drip to the first washing liquid inlet duct 3a, from which it may be recovered. Furthermore, such an arrangement provides for both recovery of unused washing liquid and uniform introduction of washing liquid to the filter cake with a fairly simple construction for providing recovery of unused washing liquid.

According to still another embodiment of the first aspect, the flow control means 7d are arranged adjust the gas pressure of the compressed gas inlet to one or more predetermined values. Particularly, the flow control means 7d are suitably arranged to provide a suitable gas flow for flushing unused washing liquid remaining in the washing liquid inlet channel 3, and additionally, a suitable gas flow for drying the filter cake.

According to a second aspect of the disclosure, a filter system is provided. The filter system comprises a horizontal pressure filter 1 according to any of the embodiments of the first aspect, and a washing liquid reservoir.

The washing liquid reservoir is in flow connection with the washing liquid inlet for feeding unused washing liquid from the washing liquid reservoir to the filter chamber via the washing liquid inlet channel 3. The washing liquid reservoir is also in flow connection with the washing liquid recovery outlet for recovering unused washing liquid from the washing liquid inlet channel 3 to the washing liquid reservoir via the washing liquid recovery channel 5.

Furthermore, the flow control means 7a-7e are arranged to selectively open the flow connection between the washing liquid reservoir and the filter chamber via the washing liquid inlet channel 3, and close the flow connection between the washing liquid inlet channel 3 and the washing liquid reservoir via the washing liquid recovery outlet, for feeding washing liquid to the filter chamber.

Additionally, the flow control means 7a-7e are arranged to selectively close the flow connection between the washing liquid reservoir and the washing liquid inlet channel 3, and open the flow connection between the washing liquid reservoir and the washing liquid recovery outlet, for recovering unused washing liquid from the washing liquid inlet channel 3 via the washing liquid recovery channel 5.

According to a third aspect of the disclosure, a method of operating a horizontal pressure filter 1 is provided. In the method, a horizontal pressure filter 1 according to any of the embodiments of the first aspect is provided.

Slurry is fed into the filter chamber via the slurry feed channel 2, and filtrate received from the filter chamber via the filtrate outlet channel 4.

Unused washing liquid is fed into the filter chamber via the washing liquid inlet channel 3 and used washing liquid is received from the filter chamber via the washing liquid discharge channel 8.

Furthermore, unused washing liquid remaining in the washing liquid inlet channel 3 is recovered to the washing liquid recovery channel 5 by opening a flow connection between the washing liquid inlet channel 3 and the washing liquid recovery channel 5, and respectively, between the compressed gas inlet 6 and the washing liquid inlet channel 3, such that a gas flow from the compressed gas inlet 6 to the washing liquid recovery channel 5 via the washing liquid inlet channel 3 is induced.

The gas flow from the compressed gas inlet 6 via the washing liquid inlet channel 3 to the washing liquid recovery channel is kept open for a sufficiently long period of time that washing liquid remaining in the washing liquid inlet channel 3 is flushed. Preferably, but not necessarily, this is achieved by using a timer set to a predetermined value in connection with the control device controlling the flow control means 7a-7e. Alternatively, other means may be used for controlling the length of the gas flow. For example, the weight of the filter plates may be weighted using a weighting arrangement, and the gas flow induced until a predetermined decrease in weight is achieved. Such a weighting arrangement in described in publication WO 2015/018975 A1, for example.

According to another embodiment of the third aspect, a horizontal pressure filter 1 having at least a first washing liquid inlet duct 3a and a second washing liquid inlet duct 3b, as described above, is provided.

Unused washing liquid remaining in the washing liquid inlet channel 3 is flushed to the washing liquid recovery channel 5 by opening a flow connection between either the first 3a, the second 3b or both washing liquid inlet ducts 3a, 3b, and the washing liquid recovery channel 5, and respectively, between the compressed gas inlet 6 and the first 3a, the second 3b or both washing liquid inlet ducts 3a, 3b.

As a result, a gas flow is induced from the compressed gas inlet 6 to the washing liquid recovery channel 5 via the first, second or both washing liquid inlet ducts 3, so as to flush unused washing liquid remaining in the washing liquid inlet channel 3 to the washing liquid recovery outlet.

According to a further embodiment of the third aspect, a horizontal pressure filter 1 having at least a first washing liquid inlet duct 3a and a second washing liquid inlet duct 3b, as described above, is provided. Moreover, the flow control means 7a-7e are arranged to selectively open or close a flow connection between the first washing liquid inlet duct 3a and the washing liquid recovery channel 5, and respectively, between the compressed gas inlet 6 and the second washing liquid inlet duct 3b.

Unused washing liquid remaining in the washing liquid inlet channel 3 is flushed to the washing liquid recovery channel 5 by opening a flow connection between the first washing liquid inlet duct 3a and the washing liquid recovery channel 5, and respectively, between the compressed gas inlet 6 and the second washing liquid inlet duct 3b.

As a result, a gas flow from the compressed gas inlet 6 to the washing liquid recovery channel 5 is induced via the second washing liquid inlet duct 3b, the flow route between the first and second washing liquid inlet ducts 3a, 3b, and the first washing liquid inlet duct 3a.

According to still another embodiment, a horizontal pressure filter 1 having at least a first washing liquid inlet duct 3a and a second washing liquid inlet duct 3b, as described above, is provided. Moreover, the flow control means 7a-7f are arranged to selectively open or close a flow connection between the first washing liquid inlet duct 3a and the washing liquid recovery channel 5, and respectively, between the compressed gas inlet 6 and the first 3a or second 3b washing liquid inlet duct.

Unused washing liquid remaining in the washing liquid inlet channel 3 is flushed to the washing liquid recovery channel 5 by opening a flow connection between the first washing liquid inlet duct 3a and the washing liquid recovery channel 5, and respectively, between the compressed gas inlet 6 and the first 3a or second 3b washing liquid inlet duct.

Particularly, a gas flow from the compressed gas inlet 6 to the washing liquid recovery channel 5 can be induced, at different time instances, firstly, via the second washing liquid inlet duct 3b, the flow route between the first and second washing liquid inlet ducts 3a, 3b, and the first washing liquid inlet duct 3a, or secondly, via the first washing liquid inlet duct 3a.

According to a further embodiment of the third aspect, a horizontal pressure filter having at least a first washing liquid inlet duct 3a and a second washing liquid inlet duct 3b, as described above, is provided.

Moreover, the flow control means 7a-7e are arranged to selectively open or close a flow connection between the first washing liquid inlet duct 3a and the washing liquid recovery channel 5, and respectively, between the compressed gas inlet 6 and the second 3b washing liquid inlet duct, such that a gas flow from the compressed gas inlet 6 to the washing liquid recovery channel 5 can be induced, at different time instances, via different routes.

Unused washing liquid remaining in the washing liquid inlet channel 3 is flushed to the washing liquid recovery channel 5 by opening a flow connection between the first washing liquid inlet duct 3a and the washing liquid recovery channel 5, and respectively, between the compressed gas inlet 6 and the second 3b washing liquid inlet duct.

Particularly, a gas flow from the compressed gas inlet 6 to the washing liquid recovery channel 5 can be induced, at different time instances, via different routes.

Firstly, the gas flow from the compressed gas inlet 6 to the washing liquid recovery channel 5 can be induced via the second washing liquid inlet duct 3b, the flow route between the first and second washing liquid inlet ducts 3a, 3b provided as either via the filter chamber or one or more dedicated passages 3c formed within one or more filter plates the, and the first washing liquid inlet duct 3a.

Secondly, the gas flow from the compressed gas inlet 6 to the washing liquid recovery channel 5 can be induced via the second washing liquid inlet duct 3b, the flow route between the first and second washing liquid inlet ducts 3a, 3b provided as one or more dedicated bypass ducts 3d running between the first and second washing liquid inlet ducts 3a, 3b, and the first washing liquid inlet duct 3a.

According to still another embodiment of the third aspect, a horizontal pressure filter 1 having at least a first washing liquid inlet duct 3a and a second washing liquid inlet duct 3b, as described above, is provided. Moreover, the flow control means 7a-7e are arranged to selectively open or close a flow connection between the first washing liquid inlet duct 3a and the washing liquid recovery channel 5, and respectively, between the compressed gas inlet 6 and the first washing liquid inlet duct 3b.

Unused washing liquid remaining in the washing liquid inlet channel 3 is flushed to the washing liquid recovery channel 5 by opening a flow connection between the first washing liquid inlet duct 3a and the washing liquid recovery channel 5, and respectively, between the compressed gas inlet 6 and the first washing liquid inlet duct 3a.

As a result, a gas flow from the compressed gas inlet 6 to the washing liquid recovery channel 5 via the first washing liquid inlet duct 3a is induced, so as to flush unused washing liquid remaining in the washing liquid inlet channel 3 to the washing liquid recovery outlet.

According to a fourth aspect of the disclosure, a computer program product is provided. The computer program product comprises instruction that, when executed by a control device arranged to control a horizontal filter press 1 according to any of the embodiments of the first aspect, will implement any of the methods according any of the embodiments of the third aspect.

Figures 1A, 1B:
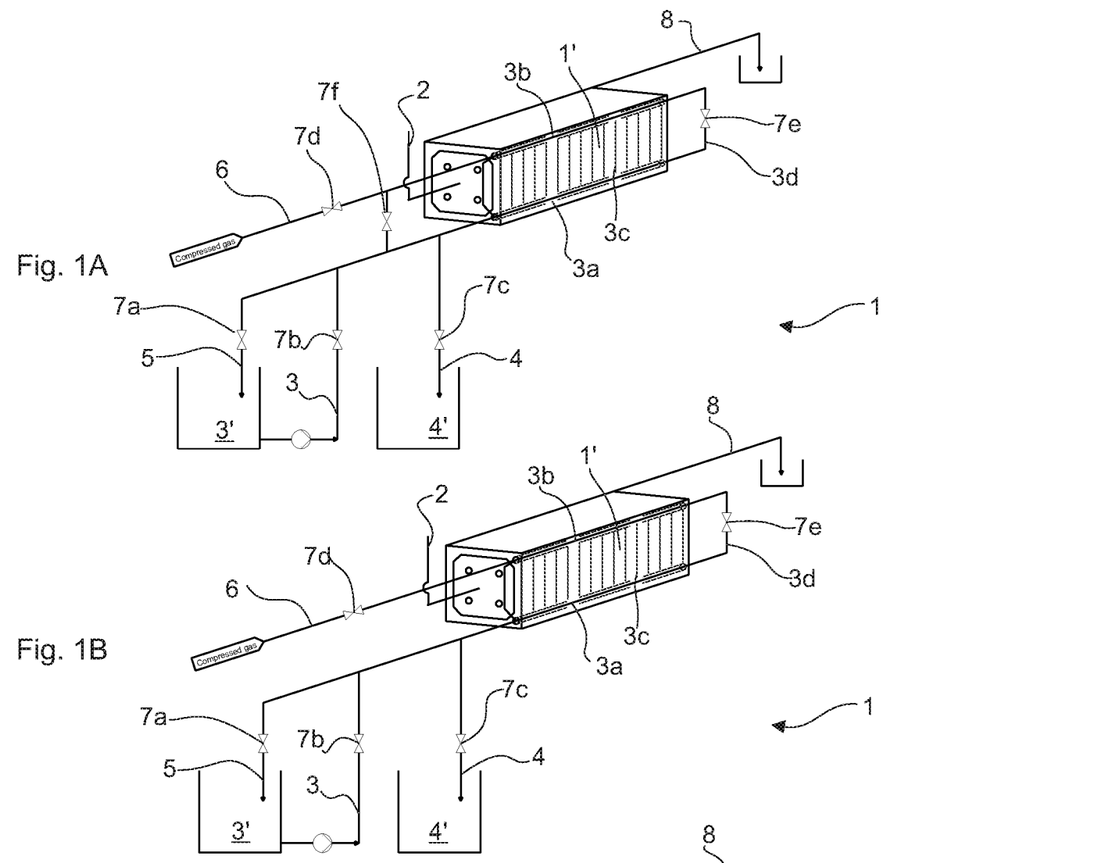
FIGS. 1A, 1B and 1C illustrate horizontal pressure filter arrangements in which a washing liquid inlet channel, a washing liquid recovery channel, a filtrate outlet channel, and a compressed gas inlet are provided at a same end of the pressure filter, while a dedicated bypass duct is provided at an opposite end.

FIG. 1A illustrates schematically a representation of a horizontal pressure filter 1, in which the filtrate outlet channel 4, washing liquid inlet channel 3 and the washing liquid recovery channel 5 are arranged at the same end of the horizontal pressure filter 1 as the compressed gas inlet 6, said end being preferably the fixed end. Moreover, the washing liquid inlet channel 3 comprises at least a first washing liquid inlet duct 3a, and above this, at least a second washing liquid inlet duct 3b, while a dedicated bypass duct 3d between said first and second inlet ducts 3a, 3b is arranged at an opposite end of the horizontal pressure filter with respect to the compressed gas inlet, said opposite end being preferably the moving end. Moreover, the compressed gas inlet 6 is connected to the second washing liquid inlet duct 3b.

Slurry feed channels 2 are formed by consecutive openings in adjacent filter plates for feeding slurry to the filter chambers. In the enclosed drawings four slurry feed channels 2 are represented. However, any other number of slurry feed channels may be provided.

A filtrate outlet channel 4 is provided for receiving filtrate from the filter chambers. The filtrate outlet channel 4 runs from the filter chambers to a filtrate outlet for collecting filtrate to a reservoir 4'.

A washing liquid inlet channel 3 runs from a washing liquid reservoir to the filter chambers. In the arrangement of FIG. 1A, the washing liquid inlet channel 3 branches into a first washing liquid inlet duct 3a and a second washing liquid inlet duct 3b. As both of the washing liquid inlet ducts 3a, 3b are connected to the filter chamber, a flow route between said washing liquid inlet ducts is realized via the filter chamber. The first washing liquid inlet duct 3a is, when in use, below the second washing liquid inlet duct. Dedicated passages 3c, formed within the filter plates also connect the first and second washing liquid inlet ducts 3a, 3b with each other. Additionally, a dedicated bypass duct 3d is provided at an end of the horizontal pressure filter 1 for connecting the first washing liquid inlet duct 3a with the second washing liquid inlet duct 3b.

A washing liquid recovery channel 5 is also provided, for recovering unused washing liquid remaining in the washing liquid inlet channel 3 after the cake washing procedure.

Additionally, a compressed gas inlet 6 is provided, and a washing liquid discharge channel 8 is provided for discarding used washing liquid.

The filtrate outlet channel 4, the washing liquid inlet channel 3, particularly, the first washing liquid inlet duct 3a thereof, and the washing liquid recovery channel 5 partially share the same physical entity as their respective flow routes. That is, the filtrate coming from the filter chamber, the unused washing liquid going to the filter chamber, and the unused washing liquid recovered from the washing liquid inlet at least partially flow through the same physical line.

Flow control means 7a-7f are provided for controlling the flow between the channels and ducts of the horizontal pressure filter. Namely, a valve 7a controls the flow to the washing liquid recovery channel 5. A valve 7b controls the flow to the washing liquid inlet channel 3. A valve 7c controls flow to the filtrate outlet channel 4. A valve 7d controls flow from the compressed gas inlet 6. A valve 7e controls flow via the dedicated bypass duct 3d. A valve 7f controls washing liquid inlet flow to the second washing liquid inlet duct 3b, and respectively, filtrate outlet flow from filtrate outlet channel 4 sharing a common physical entity with the second washing liquid inlet duct 3b as its flow route.

Particularly, when slurry is fed into the slurry feed channel 2, the valves 7a and 7b are closed and valve 7c opened to direct the filtrate to flow to the filtrate outlet channel 4. Correspondingly, when washing liquid is fed to the washing liquid inlet channel 3, valves 7a and 7c are closed, and respectively valve 7b opened, so that washing liquid is directed to the filter chamber via washing liquid inlet ducts 3a, 3b. From the filter chambers, the used washing liquid flow to the washing liquid discharge channel 8.

When unused washing liquid is recovered, valve 7a is opened, and valves 6b and 7c are close, for directing the unused washing liquid to the washing liquid recovery channel 5. This is achieved by inducing a gas flow by opening valve 7d. Suitably, the gas flow is firstly directed from the second washing liquid inlet duct 3b to the first washing liquid inlet duct 3a, and further to the washing liquid recovery channel 5, via the dedicated passages 3c in the filter plates by closing valves 7e and 7f. This ensure that unused washing liquid remaining in the dedicated passages 3c is also recovered. Thereafter, valve 7e is opened such that the gas flow is directed from the second washing liquid inlet duct 3b to the first washing liquid inlet duct 3a, and further to the washing liquid recovery channel 5, via the dedicated bypass duct 3d. As the cross sectional flow area of the dedicated bypass duct 3d is larger than that the dedicated passages 3c, the greatest portion of the gas flow runs through the bypass duct 3d. As the bypass duct is positioned at an opposing end of the horizontal pressure filter 1 with respect to the compressed gas inlet 6 and the outlet of the washing liquid recovery channel 5, the gas flow runs through the whole length of the ducts 3a, 3b ensuring that remaining washing liquid is efficiently recovered.

FIG. 1B illustrates a similar arrangement to that of FIG. 1A with a slightly simplified construction. Particularly, in FIG. 1B the first washing liquid inlet duct 3a and the second washing liquid inlet duct 3b are not connected via valve 7f.

Figure 1C:
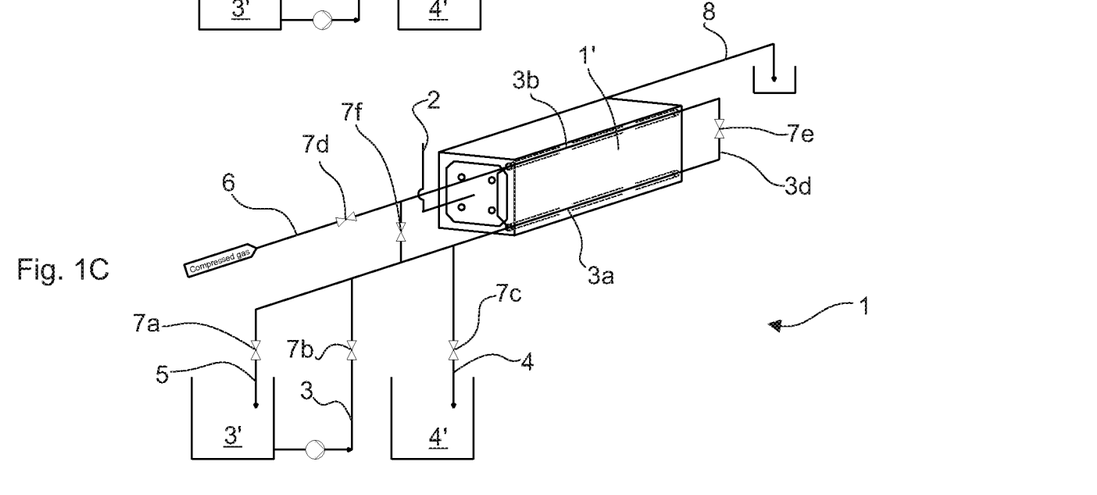

FIG. 1C illustrates a similar arrangement to that of FIG. 1A also with a slightly simplified construction. Particularly, in FIG. 1C, the filter plates are not equipped with dedicated passages 3c formed within the filter plates and running between the first washing liquid inlet duct 3a and the second washing liquid inlet duct 3b.

Figures 2A, 2B:
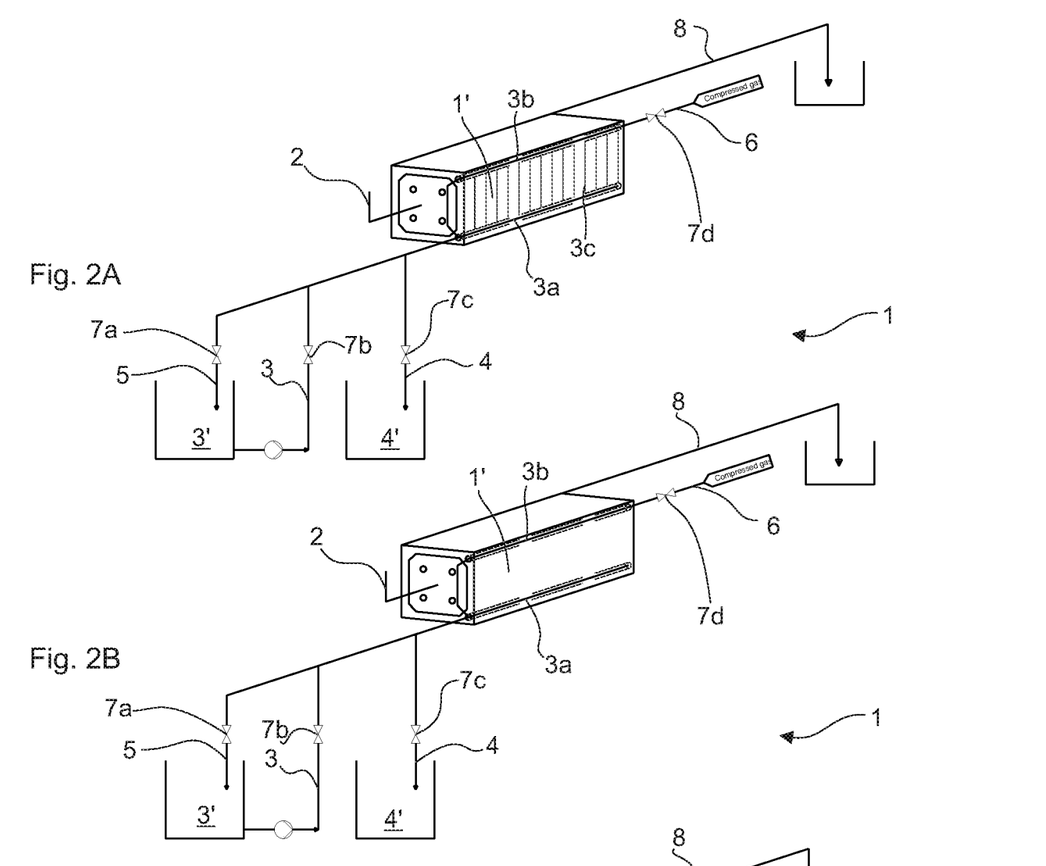
FIGS. 2A, 2B and 2C illustrate horizontal pressure filter arrangements in which a washing liquid inlet channel, a washing liquid recovery channel and a filtrate outlet channel are provided at a same end of the pressure filter, while a compressed gas inlet is provided at an opposite end in connection with a second washing liquid inlet duct.

FIG. 2A illustrates schematically a representation of a horizontal pressure filter, in which the filtrate outlet channel 3, washing liquid inlet channel 3 and the washing liquid recovery channel 6 are arranged at the same end, suitably the fixed end, of the horizontal pressure filter with respect to each other, whereas the compressed gas inlet 6, is arranged at the opposite end, suitably the moving end. Moreover, the washing liquid inlet duct 3 comprises at least a first washing liquid inlet duct 3a, and above this, at least a second washing liquid inlet duct 3b. Moreover, the compressed gas inlet 6 is connected to the second washing liquid inlet duct 3b. Dedicated passages 3c, formed within the filter plates, also connect the first and second washing liquid inlet ducts 3a, 3b with each other. When unused washing liquid is recovered from the washing liquid inlet channel 3, a gas flow is directed to the second washing liquid inlet duct 3b, from where the gas flow runs via the dedicates passages 3c and via the filter chambers to the first washing liquid inlet duct 3a, and further, to the washing liquid recovery channel 5.

FIG. 2B illustrates a similar arrangement to that of FIG. 2A, but without the dedicated passages 3c. Correspondingly, the gas flow runs from the second washing liquid duct 3b to the first washing liquid duct via the filter chamber.

Figure 2C:
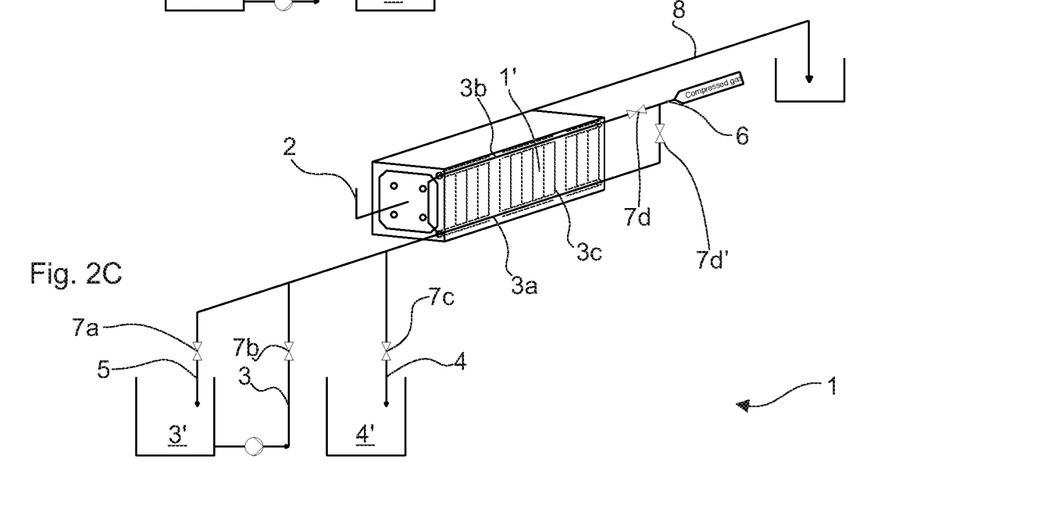

FIG. 2C also illustrates a similar arrangement to that of FIG. 2A with the exception that the compressed gas supply is connected both to the second washing liquid inlet duct 3b and the first washing liquid inlet duct 3a, the gas flow being controlled to said ducts with valves 7d and 7d', respectively. This enables the gas flow to be directed firstly to the second washing liquid inlet duct 3b and to the first washing liquid inlet duct 3a via the dedicated passages 3c, and secondly, directly to the first washing liquid inlet duct 3a. This ensures that also the washing liquid remaining in the first washing liquid inlet duct 3a can be recovered more efficiently to the washing liquid recovery channel 5.

Figures 3A, 3B:
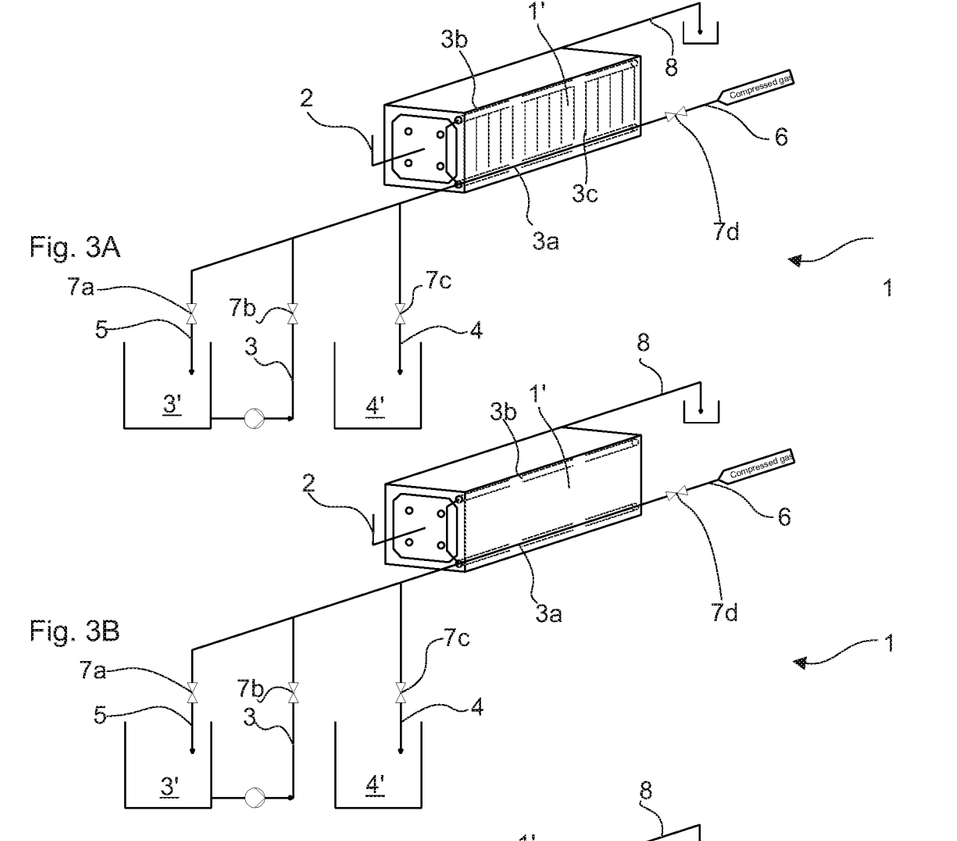

FIG. 3A illustrates schematically a representation of a horizontal pressure filter, in which the filtrate outlet channel 3, washing liquid inlet channel 3 and the washing liquid recovery channel 6 are arranged at the same end, suitably the fixed end, of the horizontal pressure filter 1 with respect to each other, whereas the compressed gas inlet 6, is arranged at the opposite end, suitably the moving end. Moreover, the washing liquid inlet duct 3 comprises at least a first washing liquid inlet duct 3a, and above this, at least a second washing liquid inlet duct 3b. The compressed gas inlet 6 is connected to the first washing liquid inlet duct 3a. Dedicated passages 3c, formed within the filter plates, also connect the first and second washing liquid inlet ducts 3a, 3b with each other, but the dedicates passages 3c do not form a flow route from the compressed gas inlet 6 to the washing liquid recovery channel 5. When unused washing liquid is recovered from the washing liquid inlet channel 3, a gas flow is directed to the first washing liquid inlet duct 3a, from where the gas flow runs to the washing liquid recovery channel 5. Hence, the dedicated passages 3c serve merely as flow routes for equalizing the washing liquid between the washing liquid inlet ducts 3a, 3b when washing liquid is fed to the filter chamber.

FIG. 3B illustrates a similar arrangement to that of FIG. 3A with the exception of not having dedicated passages 3c.

Figure 3C:
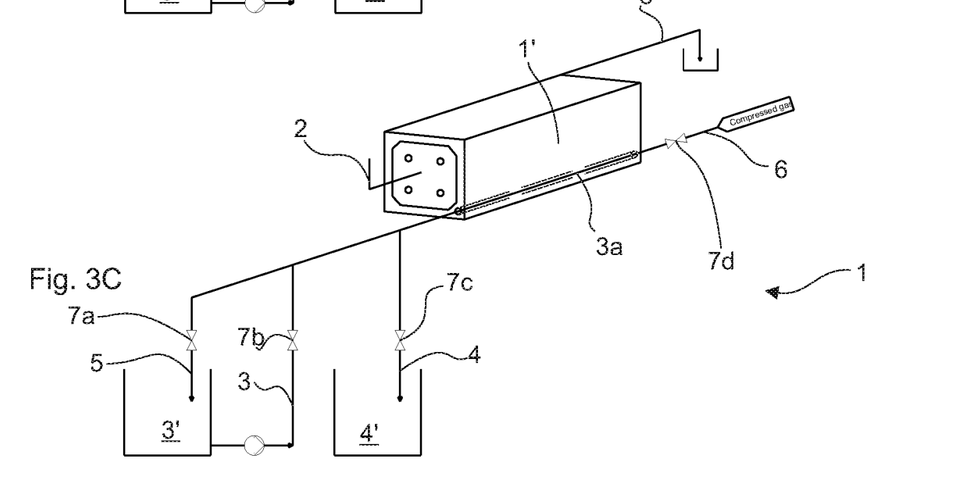

FIG. 3C also illustrates a similar arrangement to that of FIG. 3A with the exception of not having dedicated passages 3c, nor a second washing liquid inlet duct above the first washing liquid inlet duct.

Figure 4:
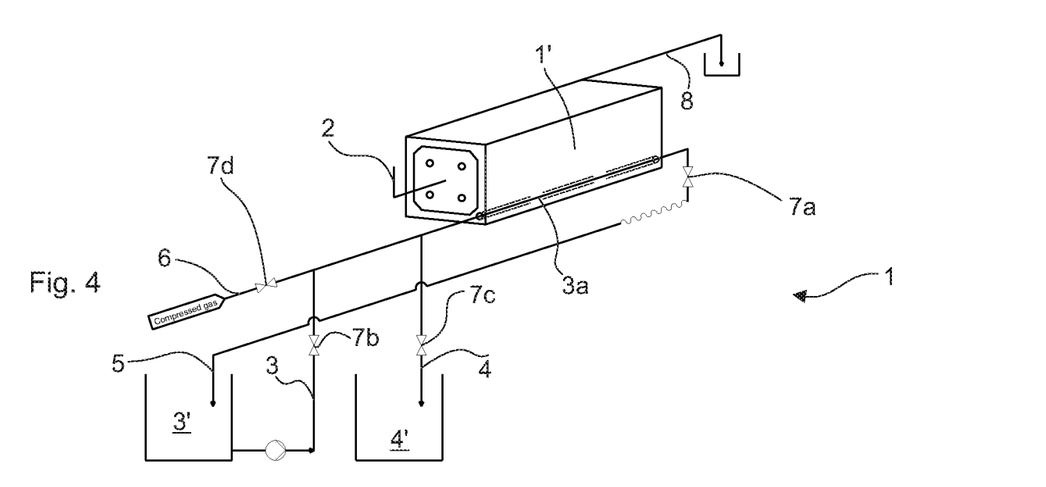
FIG. 4 illustrates a horizontal pressure filter arrangement in which a washing liquid inlet channel, a filtrate outlet channel, and a compressed gas inlet are provided at a same end of the pressure filter, while a washing liquid recovery channel is provided at an opposite end.

FIG. 4 illustrates schematically a representation of a horizontal pressure filter, in which the filtrate outlet channel 3, washing liquid inlet channel 3 and the compressed gas inlet 6 are arranged at the same end, suitably the fixed end, of the horizontal pressure filter 1 with respect to each other, whereas the washing liquid recovery channel 5 is arranged at the opposite end, suitably the moving end. Although the washing liquid inlet duct 3 is illustrated as comprising a single first washing liquid inlet duct 3a, such an arrangement may be provided with multiple washing liquid inlet ducts.

Particularly, as the washing liquid recovery channel 5 is arranged at the moving end of the horizontal pressure filter, a gas flow can be induced through the whole length of the washing liquid inlet duct 3a for flushing unused washing liquid remaining therein into the washing liquid recovery channel 5. Moreover, the washing liquid recovery channel 5 is provided a separate physical entity as it does not share the same physical flow route with the filtrate outlet channel 4 or the washing liquid inlet channel 3. Suitably, at least a part of the washing liquid recovery channel 5 is provided as a flexible hose or tubing for allowing opening and closing of the filter chamber without disconnecting the washing liquid recovery channel 5. It should be noted, that the modification of FIG. 4, i.e. providing the washing liquid recovery channel 5 as a separate physical entity at the moving end of the horizontal pressure filter, may be implemented in any of the other arrangement discussed above.

The invention claimed is:

1. A horizontal pressure filter having multiple filter plates forming at least a filter chamber therebetween, the horizontal pressure filter comprising:
   a slurry feed channel for feeding slurry into a filter chamber so as to be filtered therein;
   a filtrate outlet channel for receiving filtrate from the filter chamber and conducting the filtrate to a filtrate outlet of the horizontal pressure filter;
   a washing liquid inlet channel for feeding washing liquid from a washing liquid inlet into a filter chamber so as to wash a filter cake formed in the filter chamber;
   a washing liquid discharge channel for receiving used washing liquid from the filter chamber and conducting the used washing liquid to a washing liquid discharge outlet of the horizontal pressure filter;
   a washing liquid recovery channel for receiving unused washing liquid from the washing liquid inlet channel and conducting the unused washing liquid to a washing liquid recovery outlet;
   a compressed gas inlet; and
   a flow controller including valves,
   wherein the filtrate outlet channel, the washing liquid inlet channel and the washing liquid recovery channel each has a first end coupled to a common flow route as one another, and a second end that is separate and distinct from one another,
   wherein the flow controller is arranged to selectively open or close a flow connection between the washing liquid inlet channel and the washing liquid recovery channel,
   wherein the flow controller is arranged to selectively open or close a flow connection between the compressed gas inlet and the washing liquid inlet channel,
   wherein a gas flow from the compressed gas inlet to the washing liquid recovery channel via the washing liquid inlet channel is induced, so as to flush unused washing liquid remaining in the washing liquid inlet channel to the washing liquid recovery outlet.

2. The horizontal pressure filter according to claim 1, wherein the washing liquid inlet channel comprises at least a first washing liquid inlet duct and a second washing liquid inlet duct for feeding washing liquid into the filter chamber from at least two separate points, respectively, a flow route being provided between the first and second washing liquid inlet ducts,
   the flow controller being arranged to selectively open and close a flow connection between either the first, the second or both washing liquid inlet ducts and the washing liquid recovery channel, wherein the flow controller is arranged to selectively open or close a flow connection between the compressed gas inlet and the first, the second or both washing liquid inlet ducts,
   wherein a gas flow from the compressed gas inlet to the washing liquid recovery channel via the first, second or both washing liquid inlet ducts is induced, so as to flush unused washing liquid remaining in the washing liquid inlet channel to the washing liquid recovery outlet.

3. The horizontal pressure filter according to claim 2, wherein the flow route between the first and second washing liquid inlet ducts is provided at least via the filter chamber.

4. The horizontal pressure filter according to claim 2, wherein the flow route between the first and second washing liquid inlets ducts is provided at least via one or more dedicated passages formed within one or more of the filter plates.

5. The horizontal pressure filter according to claim 2, wherein the flow route between the first and second washing liquid inlet ducts is provided at least via one or more dedicated bypass ducts running between the first and second washing liquid inlet ducts,
   wherein the flow controller is arranged to selectively open or close the flow connection between the first and second washing fluid inlet ducts via the dedicated bypass duct.

6. The horizontal pressure filter according to claim 2, wherein the flow controller is arranged to selectively open or close a flow connection between the first washing liquid inlet duct and the washing liquid recovery channel, wherein the flow controller is arranged to selectively open or close a flow connection between the compressed gas inlet and the second washing liquid inlet duct,
   wherein a gas flow from the compressed gas inlet to the washing liquid recovery channel is induced via the second washing liquid inlet duct, the flow route between the first and second washing liquid inlet ducts, and the first washing liquid inlet duct.

7. The horizontal pressure filter according to claim 2, wherein the flow controller is arranged to selectively open or close a flow connection between the first washing liquid inlet duct and the washing liquid recovery channel, wherein the flow controller is arranged to selectively open or close a flow connection between the compressed gas inlet and the first or second washing liquid inlet duct, wherein a gas flow from the compressed gas inlet to the washing liquid recovery channel is induced, at different time instances, either via the second washing liquid inlet duct, the flow route between the first and second washing liquid inlet ducts, and the first washing liquid inlet duct, or the first washing liquid inlet duct.

8. The horizontal pressure filter according to claim 5, wherein the flow controller is arranged to selectively open or close a flow connection between the first washing liquid inlet duct and the washing liquid recovery channel, wherein the flow controller is arranged to selectively open or close a flow connection between the compressed gas inlet and the second washing liquid inlet duct, wherein a gas flow from the compressed gas inlet to the washing liquid recovery channel is induced, at different time instances, either via the second washing liquid inlet duct, the flow route between the first and second washing liquid inlet ducts provided as either via the filter chamber or one or more dedicated passages formed within one or more filter plates, and the first washing liquid inlet duct, or the second washing liquid inlet duct, the flow route between the first and second washing liquid inlet ducts provided as one or more dedicated bypass ducts running between the first and second washing liquid inlet ducts, and the first washing liquid inlet duct.

9. The horizontal pressure filter according to claim 2, wherein the flow controller is arranged to selectively open or close a flow connection between the first washing liquid inlet duct and the washing liquid recovery channel, and respectively, between the compressed gas inlet and the first washing liquid inlet duct, such that a gas flow from the compressed gas inlet to the washing liquid recovery channel via the first washing liquid inlet duct is induced, so as to flush unused washing liquid remaining in the washing liquid inlet channel to the washing liquid recovery outlet.

10. The horizontal pressure filter according to claim 2, wherein the flow controller is arranged to adjust the gas pressure of the compressed gas inlet to one or more predetermined values.

11. A filter system, comprising:
a horizontal pressure filter according to claim 1;
a washing liquid reservoir,
the washing liquid reservoir begin in flow connection with the washing liquid inlet for feeding unused washing liquid from the washing liquid reservoir to the filter chamber via the washing liquid inlet channel,
the washing liquid reservoir being in flow connection with the washing liquid recovery outlet for recovering unused washing liquid from the washing liquid inlet channel to the washing liquid reservoir via the washing liquid recovery channel, and
the flow controller being arranged to selectively:
open the flow connection between the washing liquid reservoir and the filter chamber via the washing liquid inlet channel, and close the flow connection between the washing liquid inlet channel and the washing liquid reservoir via the washing liquid recovery outlet, for feeding washing liquid to the filter chamber, and close the flow connection between the washing liquid reservoir and the washing liquid inlet channel, and open the flow connection between the washing liquid reservoir and the washing liquid recovery outlet, for recovering unused washing liquid from the washing liquid inlet channel via the washing liquid recovery outlet.

12. A method of operating a horizontal pressure filter, comprising the steps of:
providing a horizontal pressure filter according to claim 1;
feeding slurry into the filter chamber via the slurry feed channel, and receiving filtrate from the filter chamber via the filtrate outlet channel;
feeding unused washing liquid into the filter chamber via the washing liquid inlet channel and receiving used washing liquid from the filter chamber via the washing liquid discharge channel; and
recovering unused washing liquid remaining in the washing liquid inlet channel to the washing liquid recovery channel by opening a flow connection between the washing liquid inlet channel and the washing liquid recovery channel, wherein the flow controller is arranged to selectively open or close a flow connection between the compressed gas inlet and the washing liquid inlet channel, such that a gas flow from the compressed gas inlet to the washing liquid recovery channel via the washing liquid channel is induced.

13. The method of operating a horizontal pressure filter according to claim 12, further comprising:
providing the horizontal pressure filter wherein the washing liquid inlet channel comprises at least a first washing liquid inlet duct and a second washing liquid inlet duct for feeding washing liquid into the filter chamber from at least two separate points, respectively, a flow route being provided between the first and second washing liquid inlet ducts,
the flow controller being arranged to selectively open or close a flow connection between either the first, the second or both washing liquid inlet ducts and the washing liquid recovery channel, wherein the flow controller is arranged to selectively open or close a flow connection between the compressed gas inlet and the first, the second or both washing liquid inlet ducts,
wherein a gas flow from the compressed gas inlet to the washing liquid recovery channel via the first, second or both washing liquid inlet ducts is induced, so as to flush unused washing liquid remaining in the washing liquid inlet channel to the washing liquid recovery outlet, and
flushing unused washing liquid remaining in the washing liquid inlet channel to the washing liquid recovery channel by:
opening a flow connection between either the first, the second or both washing liquid inlet ducts and the washing liquid recovery channel, wherein the flow controller is arranged to selectively open or close a flow connection between the compressed gas inlet and the first, the second or both washing liquid inlet ducts,
wherein a gas flow from the compressed gas inlet to the washing liquid recovery channel via the first, second or both washing liquid inlet ducts is induced, so as to flush unused washing liquid remaining in the washing liquid inlet channel to the washing liquid recovery outlet.

14. The method of operating a horizontal pressure filter according to claim 12, further comprising:

providing the horizontal pressure filter wherein the flow controller is arranged to selectively open or close a flow connection between a first washing liquid inlet duct and the washing liquid recovery channel, wherein the flow controller is arranged to selectively open or close a flow connection between the compressed gas inlet and a second washing liquid inlet duct; and flushing unused washing liquid remaining in the washing liquid inlet channel to the washing liquid recovery channel by:

opening a flow connection between the first washing liquid inlet duct and the washing liquid recovery channel, wherein the flow controller is arranged to selectively open or close a flow connection between the compressed gas inlet and the second washing liquid inlet duct, such that a gas flow from the compressed gas inlet to the washing liquid recovery channel is induced via the second washing liquid inlet duct, the flow route between the first and second washing liquid inlet ducts, and the first washing liquid inlet duct.

15. The method of operating a horizontal pressure filter according to claim 13, further comprising:

providing the horizontal pressure filter wherein the flow controller is arranged to selectively open or close a flow connection between the first washing liquid inlet duct and the washing liquid recovery channel, wherein the flow controller is arranged to selectively open or close a flow connection between the compressed gas inlet and the first or second washing liquid inlet duct, such that a gas flow from the compressed gas inlet to the washing liquid recovery channel is induced, at different time instances, either via the second washing liquid inlet duct, the flow route between the first and second washing liquid inlet ducts, and the first washing liquid inlet duct, or the first washing liquid inlet duct, and flushing unused washing liquid remaining in the washing liquid inlet channel to the washing liquid recovery channel by:

opening a flow connection between the first washing liquid inlet duct and the washing liquid recovery channel, wherein the flow controller is arranged to selectively open or close a flow connection between the compressed gas inlet and the first or second washing liquid inlet duct, such that a gas flow from the compressed gas inlet to the washing liquid recovery channel is induced, at different time instances, either via the second washing liquid inlet duct, the flow route between the first and second washing liquid inlet ducts, and the first washing liquid inlet duct, or the first washing liquid inlet duct.

16. The method of operating a horizontal pressure filter according to claim 13, further comprising:

providing the horizontal pressure filter wherein the flow controller is arranged to selectively open or close a flow connection between the first washing liquid inlet duct and the washing liquid recovery channel, wherein the flow controller is arranged to selectively open or close a flow connection between the compressed gas inlet and the second washing liquid inlet duct, such that a gas flow from the compressed gas inlet to the washing liquid recovery channel is induced, at different time instances, either via the second washing liquid inlet duct, the flow route between the first and second washing liquid inlet duct provided as either via the filter chamber or one or more dedication passages formed within one or more filter plates, and the first washing liquid inlet duct, or the second washing liquid inlet duct, the flow route between the first and second washing liquid inlet duct provided as one or more dedicated bypass ducts running between the first and second washing liquid inlet ducts, and the first washing liquid inlet duct, and flushing unused washing liquid remaining in the washing liquid inlet channel to the washing liquid recovery channel by:

opening a flow connection between the first washing liquid inlet duct and the washing liquid recovery channel, wherein the flow controller is arranged to selectively open or close a flow connection between the compressed gas inlet and the second washing liquid inlet duct, such that a gas flow from the compressed gas inlet to the washing liquid recovery channel is induced, at different time instances, either via the second washing liquid inlet duct, the flow route between the first and second washing liquid inlet ducts provided as either via the filter chamber or one or more dedicated passages formed within one or more filter plates, and the first washing liquid inlet duct, or the second washing inlet duct, the flow route between the first and second washing liquid inlet ducts provided as one or more dedicated bypass ducts running between the first and second washing liquid inlet ducts, and the first washing liquid inlet duct.

17. The method of operating a horizontal pressure filter according to claim 13, further comprising:

providing the horizontal pressure filter wherein the flow controller is arranged to selectively open or close a flow connection between the first washing liquid inlet duct and the washing liquid recovery channel, wherein the flow controller is arranged to selectively open or close a flow connection between the compressed gas inlet and the first washing liquid inlet duct, such that a gas flow from the compressed gas inlet to the washing liquid recovery channel via the first washing liquid inlet duct is induced, so as to flush unused washing liquid remaining in the washing liquid inlet channel to the washing liquid recovery outlet, and flushing unused washing liquid remaining in the washing liquid inlet channel to the washing liquid recovery channel by:

opening a flow connection between the first washing liquid inlet duct and the washing liquid recovery channel, wherein the flow controller is arranged to selectively open or close a flow connection between the compressed gas inlet and the first washing liquid inlet duct, such that a gas flow from the compressed gas inlet to the washing liquid recovery channel via the first washing liquid inlet duct is induced, so as to flush unused washing liquid remaining in the washing liquid inlet channel to the washing liquid recovery outlet.

* * * * *